(12) United States Patent
Zhang

(10) Patent No.: US 8,746,628 B2
(45) Date of Patent: Jun. 10, 2014

(54) TRACK CIRCUIT TRANSCEIVER

(75) Inventor: Jingwang Zhang, Rancho Cucamonga, CA (US)

(73) Assignee: Siemens Industry, Inc., Alpharetta, GA (US)

( * ) Notice: Subject to any disclaimer, the term of this patent is extended or adjusted under 35 U.S.C. 154(b) by 196 days.

(21) Appl. No.: 13/416,680

(22) Filed: Mar. 9, 2012

(65) Prior Publication Data
US 2013/0233979 A1 Sep. 12, 2013

(51) Int. Cl.
*B61L 1/18* (2006.01)
*H04B 1/44* (2006.01)

(52) U.S. Cl.
CPC .. *B61L 1/181* (2013.01); *H04B 1/44* (2013.01)
USPC ......... 246/28 R; 246/122 R; 455/78; 375/219

(58) Field of Classification Search
CPC .............. H04B 1/44; H04B 1/48; B61L 1/18; B61L 1/181; B60L 3/00
USPC .......... 246/34 R, 34 B, 62, 122 R, 28 R, 256; 455/73, 74, 78, 79, 83; 375/219, 221
See application file for complete search history.

(56) References Cited

U.S. PATENT DOCUMENTS

| | | | |
|---|---|---|---|
| 5,769,364 A * | 6/1998 | Cipollone | 246/34 B |
| 5,939,977 A * | 8/1999 | Monson | 340/442 |
| 7,292,827 B2 * | 11/2007 | McCorkle | 455/78 |
| 7,961,014 B2 * | 6/2011 | Behel | 327/108 |
| 8,363,705 B2 * | 1/2013 | Tang et al. | 375/220 |
| 8,380,905 B2 * | 2/2013 | Djabbari et al. | 710/110 |
| 8,577,305 B1 * | 11/2013 | Rossi et al. | 455/76 |
| 2006/0158223 A1 * | 7/2006 | Wang et al. | 326/86 |
| 2009/0194643 A1 | 8/2009 | Bohlmann et al. | |
| 2013/0088234 A1 * | 4/2013 | Ham | 324/322 |

FOREIGN PATENT DOCUMENTS

| | | |
|---|---|---|
| GB | 2162664 A | 2/1986 |
| JP | 2005059624 A | 3/2005 |

OTHER PUBLICATIONS

Intellectual Property Office Search Report mailed Aug. 8, 2013 corresponding to GB Patent Application No. 1303580.3 (3 pages).

* cited by examiner

*Primary Examiner* — Mark Le

(57) ABSTRACT

Transceivers may be used in track circuits. A transceiver may comprise an H-bridge circuit comprising at least four switches. A control unit in communication with the H-bridge circuit may be constructed and arranged to selectively drive the at least four switches to selectively cause the H-bridge circuit to function as a transmitter or a receiver. A power supply terminal in communication with the H-bridge circuit may be constructed and arranged to connect to a power supply. A track interface terminal in communication with the H-bridge circuit may be constructed and arranged to connect to a track interface cable so that the H-bridge circuit is capable of transmitting signals to and/or receiving signals from the track interface cable.

47 Claims, 12 Drawing Sheets

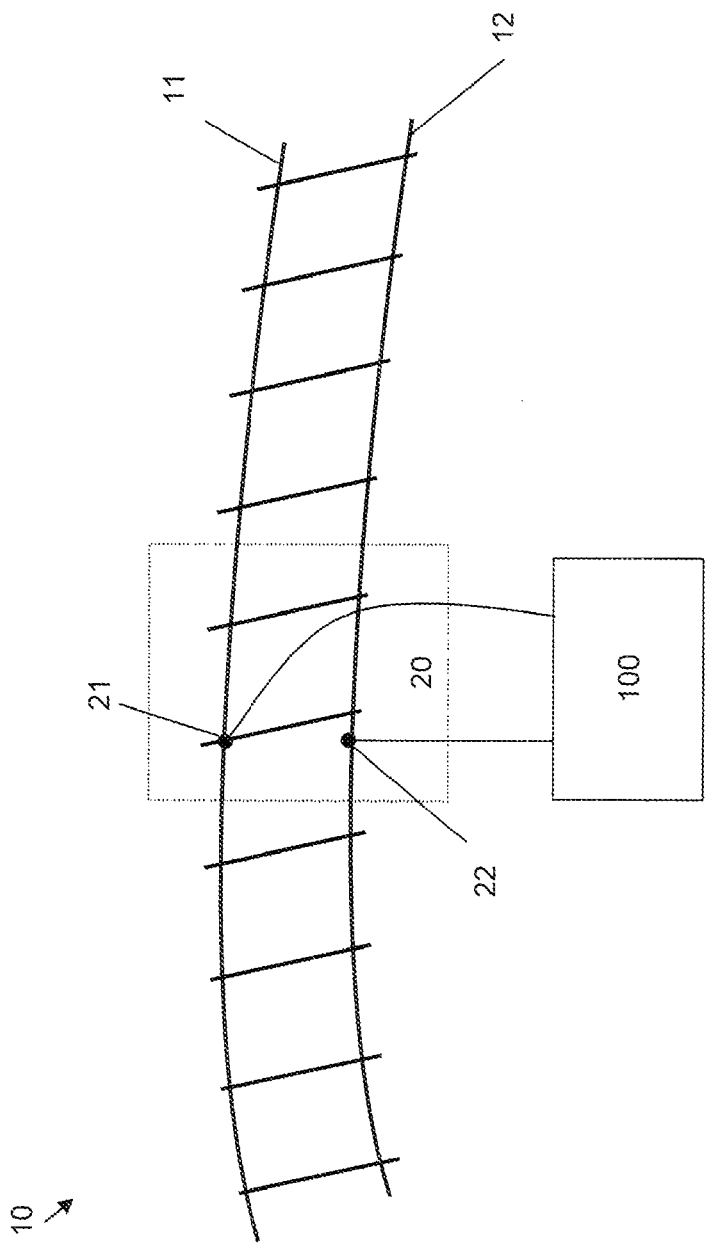

TRACK CIRCUIT TRANSCEIVER

BACKGROUND

Track circuits may be used in the railroad industry to detect the presence of a train in a block of track. Track circuit hardware may include transmitters and receivers configured to work with coded AC, coded DC, or audio frequency (AF) signals. Different track circuits may function in different ways to detect trains and may therefore have different hardware requirements. For example, some track circuits (such as AC overlay circuits) may have a transmitter configured to transmit a signal through the track rails at one end of a block of track and a receiver connected to the rails at the other end of the block and configured to detect the signal. Other than the connection through the track rails, there may typically be no connection between the transmitter and receiver for a block. When a train is present in a block of track monitored by a track circuit, the train may shunt, or short, the two rails, with the result that no signal is received at the receiver. Thus, the receiver may use the presence or absence of a detected signal to indicate whether or not a train is present in the block. In some other track circuits, sometimes referred to as constant warning time circuits, a transmitter may transmit a signal over a circuit formed by the rails of the track and one or more shunts positioned at desired approach distances from the transmitter. A receiver may detect one or more resulting signal characteristics, and a logic circuit such as a microprocessor or hardwired logic may detect the presence of a train and may determine its speed and distance from a location of interest such as a crossing. The track circuit may detect a train and determine its distance and speed by measuring impedance changes due to the train's wheels and axle acting as a shunt across the rails and thereby effectively shortening the length (and hence the impedance) of the rails in the circuit. Those of skill in the art will recognize that other configurations of track circuits are possible.

Transmitters used in some track circuits may comprise H-bridge circuits. These H-bridges may comprise four transistors, such as MOSFETs, used as switches to perform signal generation for transmitting only. By opening and closing the switches, the H-bridge can be controlled to direct a signal from a power supply through an attached track load (i.e. the railroad track) with a defined voltage, current, and polarity. A transmitter using a four-transistor H-bridge can transmit a signal to the track load, and a separate receiver can receive the signal to detect the presence or absence of a train on the track. Transmitters using four-transistor H-bridges may need different physical hardware configurations for different types of track circuits, and may be unable to function as transceivers for the track circuit, so a separate receiver may be required.

BRIEF DESCRIPTION OF THE DRAWINGS

FIG. 1A depicts a railroad track and track circuit according to an embodiment of the invention.

DETAILED DESCRIPTION OF EMBODIMENTS

Figure 1B:
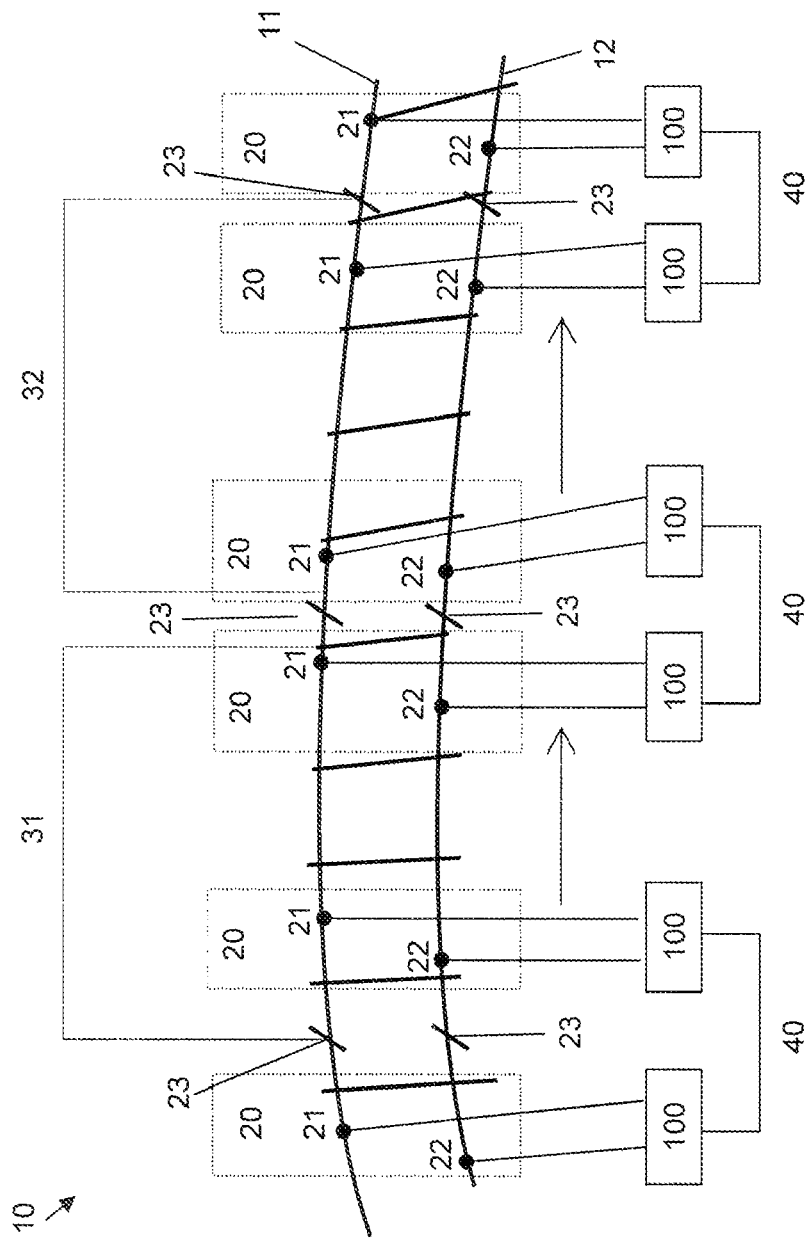
FIG. 1B depicts a railroad track and track circuits according to an embodiment of the invention.

In the following detailed description specific details, such as particular circuit configurations, are set forth in order to provide a thorough understanding of the embodiments discussed below. The details discussed in connection with the following embodiments should not be understood to limit the present invention. Furthermore, for ease of understanding, certain method steps are delineated as separate steps; however, these steps should not be construed as necessarily distinct nor order dependent in their performance.

A track circuit transceiver that may work with a plurality of track circuit types is described herein. For example, different track circuits may employ coded AC, coded DC, or audio frequency (AF) signals for train detection. Coded DC circuits may also be known as pulsated direct current (DC) circuits, and coded AC circuits may also be known as pulsated alternating current (AC) circuits. Those of ordinary skill in the relevant art may also refer to these circuits as DC circuits and AC circuits, respectively. The pulsating frequency of coded track circuits may be below 20 Hz frequency in some embodiments referred to as very low frequency (VLF) track circuits. The frequency of AF circuits may be within an audio frequency (20 Hz to 20 KHz) range. Embodiments of the transceiver may work with different track circuits and signal types without hardware modification. FIG. 1A depicts a railroad track and track circuit according to an embodiment of the invention. A railroad track 10 may comprise a pair of tracks 11 and 12. A track interface 20 may comprise electrical connections 21 and 22 which may electrically couple to the tracks 11 and 12. In some embodiments the track interface 20 may comprise additional elements (for example track signal couplers, surge protection devices, impedance matching devices, filtering circuits, etc.). The track interface 20 may communicate with a transceiver 100. The transceiver 100, the track interface 20, and the tracks 11 and 12 themselves may form elements of an electrical circuit. Shunts between the tracks 11 and 12 and/or a train on the track 10 may complete the circuit.

FIG. 1B depicts a railroad track and track circuits according to an embodiment of the invention. In this example, a plurality of transceivers 100 and track interfaces 20 may be provided. Pairs of transceivers 100 may comprise train detection blocks 31 and 32. The train detection blocks 31 and 32 may or may not be isolated and/or insulated. For example, isolation may be provided by isolated joints 23 on the tracks 11 and 12. A unidirectional coded AC or coded DC signal may be passed between pairs of transceivers 100 through the tracks 11 and 12 within a detection block 31 and 32. Each of the pair of transceivers 100 may be in communication with another transceiver 100 that is located in a substantially same location 40 along the track 10. When a transceiver 100 in one detection block 31 receives a signal through the tracks 11 and 12, it may communicate the signal (through a local network, for example) to the other transceiver 100 located in the substantially same location 40, and that other transceiver 100 may send the signal through its own detection block 32.

Figure 1C:
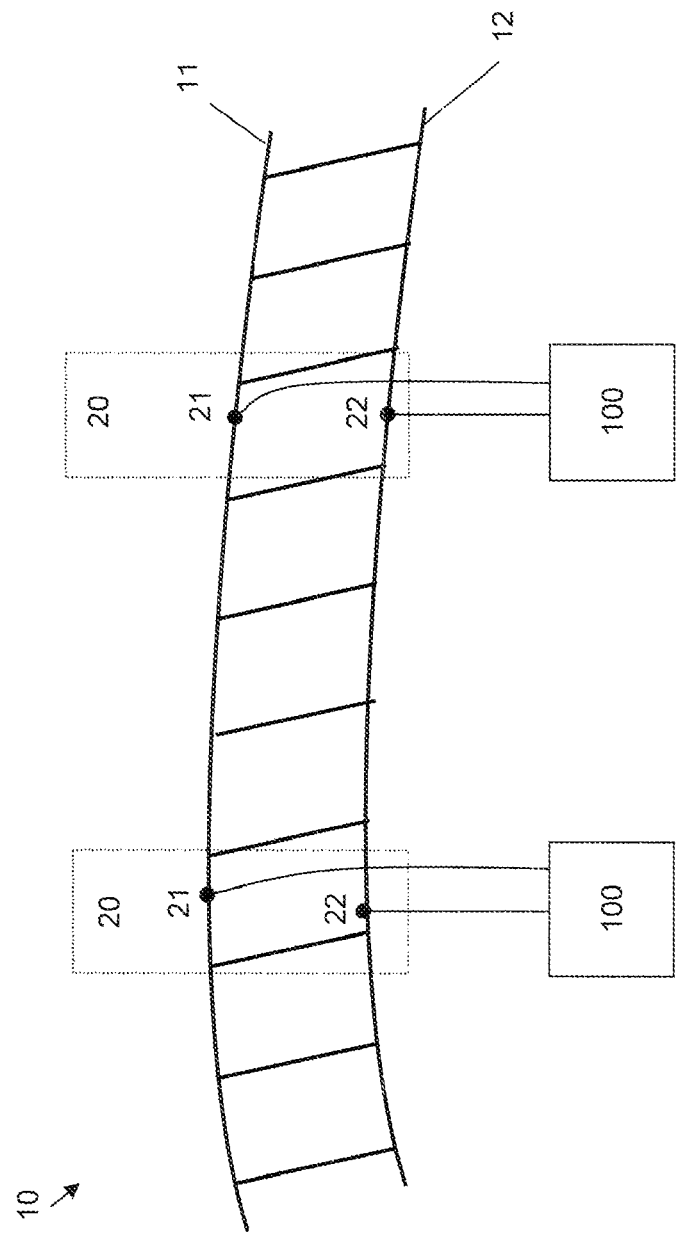
FIG. 1C depicts a railroad track and track circuits according to an embodiment of the invention.

FIG. 1C depicts a railroad track and track circuits according to an embodiment of the invention. In this example, a plurality of transceivers 100 and track interfaces 20 may be provided. A bidirectional coded AC or coded DC signal may be passed between transceivers 100 through the tracks 11 and 12.

Figure 1D:
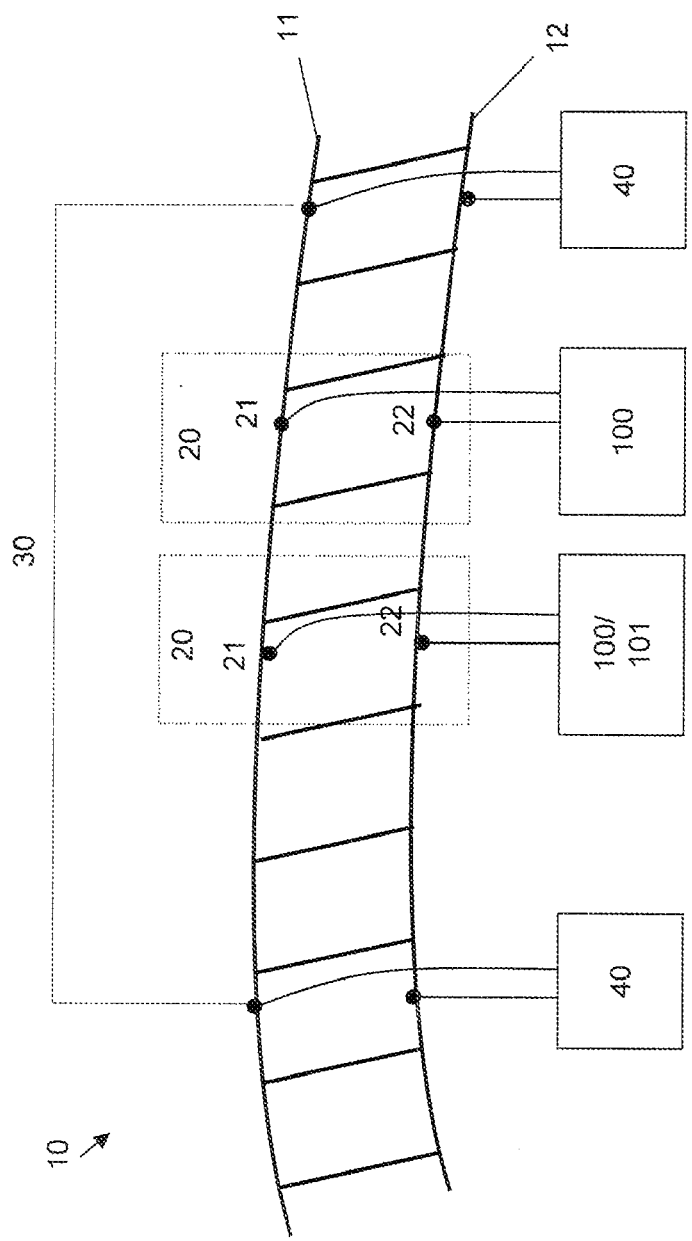
FIG. 1D depicts a railroad track and track circuits according to an embodiment of the invention.

FIG. 1D depicts a railroad track and track circuits according to an embodiment of the invention. This example configuration may enable bidirectional train detection in an AF system. Shunts 40 may define the ends of a train detection block 30 through which a first transceiver 100 may transmit a signal. The transceiver 100 may be located in a substantially central position within the block 30, and the signal may travel in both directions along the rails 11 and 12 from the transceiver 100 through the shunts 40 and back. Another transceiver 100 (or a receiver 101) may be located near the first transceiver 100 and may detect the transmitted AF signal through the rails 11 and 12.

Figure 1E:
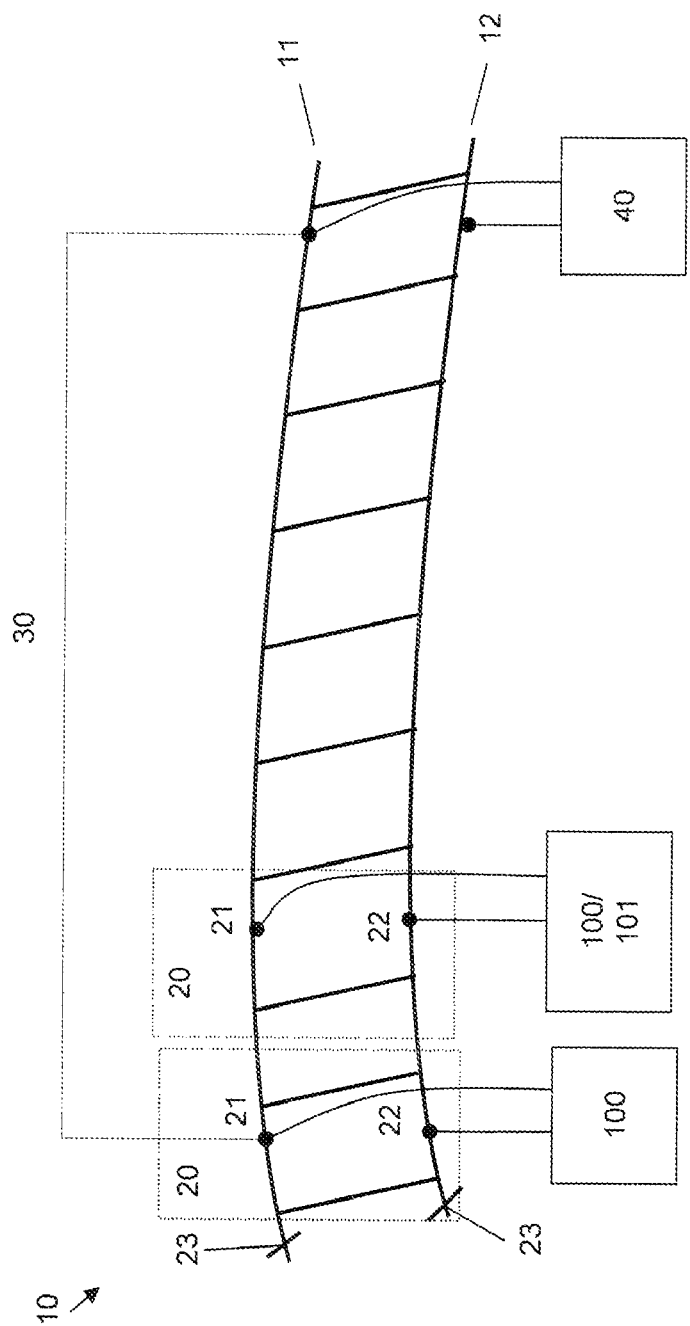
FIG. 1E depicts a railroad track and track circuits according to an embodiment of the invention.

FIG. 1E depicts a railroad track and track circuits according to an embodiment of the invention. This example configuration may enable unidirectional train detection in an AF system. A shunt 40 may define one end of a train detection block 30 through which a first transceiver 100 may transmit a signal, and the first transceiver 100 may define the other end. The signal may travel from the transceiver 100 through the shunt 40 and back along the rails 11 and 12 in one direction. Another transceiver 100 (or a receiver 101) may be located near the first transceiver 100 and may detect the transmitted AF signal through the rails 11 and 12. The train detection block 30 may or may not be isolated and/or insulated. For example, isolation may be provided by isolated joints 23 on the tracks 11 and 12.

For additional examples of track circuits, see U.S. patent application Ser. No. 12/724,800, filed Mar. 16, 2010 and entitled "Decoding Algorithm For Frequency Shift Key Communications"; U.S. patent application Ser. No. 12/839,231, filed Jul. 19, 2010 and entitled "Track Circuit Communications"; U.S. patent application Ser. No. 12/911,092, filed Oct. 25, 2010 and entitled "Method and Apparatus for Bi-Directional Downstream Adjacent Crossing Signaling"; and U.S. Pat. No. 7,575,202, issued Aug. 18, 2009 and entitled "Apparatus and Methods for Providing Relatively Constant Warning Time at Highway-Rail Crossings"; the entirety of each of which is hereby incorporated by reference herein.

Figure 2:
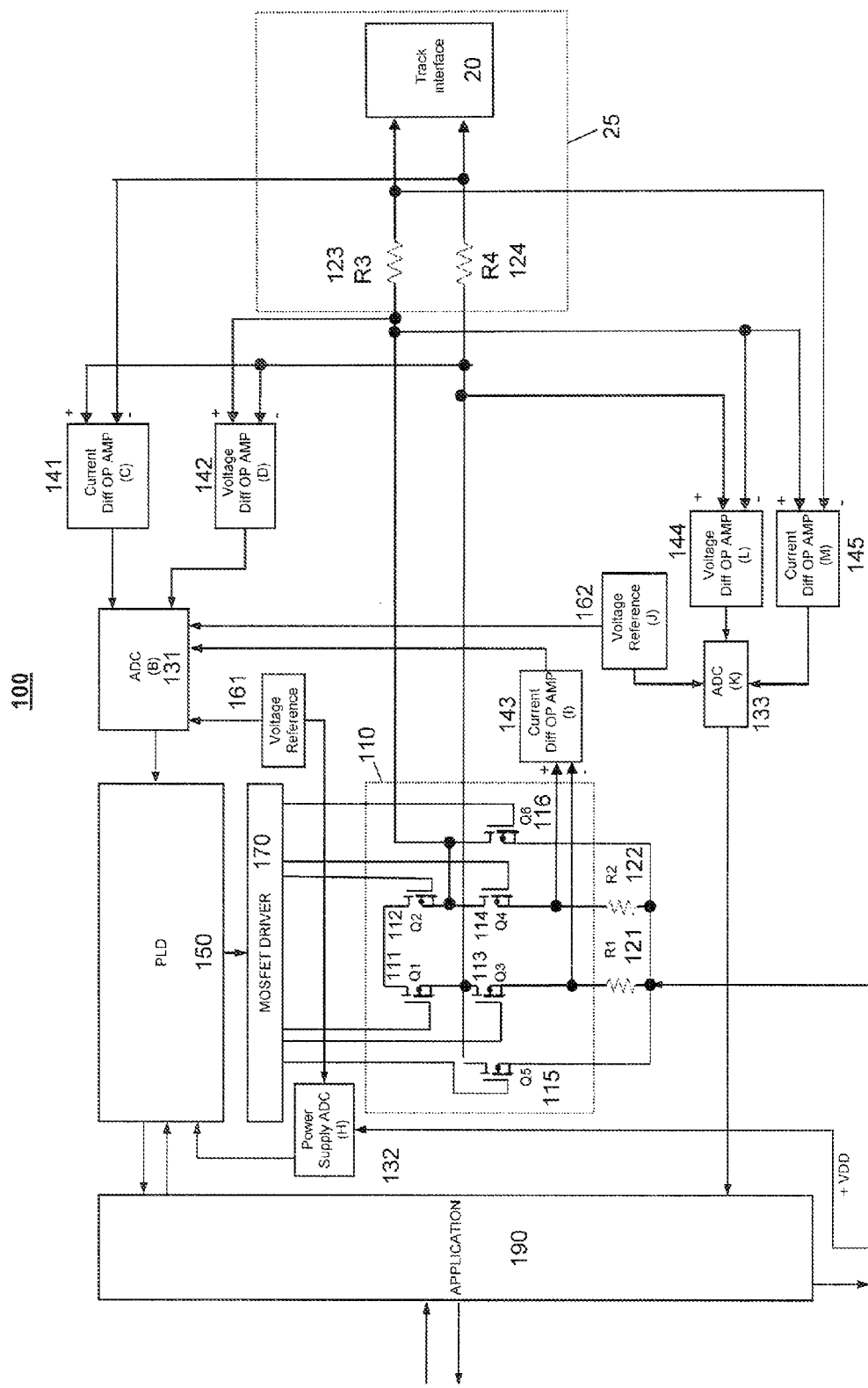
FIG. 2 depicts a track circuit transceiver according to an embodiment of the invention.

FIG. 2 depicts a track circuit transceiver 100 according to an embodiment of the invention. The example transceiver 100 of FIG. 2 may be configurable to transmit and/or receive signals of various types, such as coded AC, coded DC, or AF signals. The transceiver 100 may comprise a plurality of switching elements. Six MOSFETs 111, 112, 113, 114, 115, and 116 are shown, although other transistors, relays, or switches may be used in other embodiments. Two resistors 121 and 122 for use in current sensing operations may also be provided. The MOSFETs 111, 112, 113, 114, 115, and 116 and resistors 121 and 122 may form an advanced H-bridge circuit 110. Additional current sensing devices, such as resistors 123 and 124 or other devices that may sense current, may be provided between the H-bridge 110 and a load. In this example, the load is the track interface 20, which may provide a load when connected to a set of railroad tracks as described above. In some embodiments, a terminal may be in communication with elements of the transceiver 100 to facilitate a connection to the track interface 20. A cable may be used to connect the terminal to a set of railroad tracks. Together, the resistors 123 and 124 and the track interface 20 may comprise a load 25 for the H-bridge 110.

In the H-bridge 110 of FIG. 2, MOSFETs 111, 112, 113, 114, 115, and 116 are shown with their respective sources at certain nodes and their respective drains at certain nodes. Those of ordinary skill in the relevant art will understand that MOSFETs are symmetrical devices, and the source and drain of any MOSFET may be reversed in a circuit such as the H-bridge 110 without impacting the function of the circuit. Therefore, sources and drains may be considered interchangeable in any descriptions, figures, and/or claims herein. It will also be understood that in various embodiments, switches that are symmetrical and/or switches that are not symmetrical may be used.

The H-bridge 110 may be controlled to transmit signals to the load 20 and receive signals from the load 20. The transceiver 100 may comprise additional components to control the H-bridge 110 and/or provide other functions related to transceiver operation. For example, a transceiver 100 may comprise one or more analog to digital converters (ADCs) 131, 132, and 133; one or more differential operational amplifiers (OP-AMPs) 141, 142, 143, 144, and 145; one or more programmable logic devices (PLDs) or other logic control devices 150; one or more voltage references 161, 162; one or more MOSFET (or other switch) drivers 170; and/or one or more power supplies 180. The output voltages of the power supplies 180 may be fixed or adjustable. An application 190 may be in communication with the transceiver 100. In some embodiments, a terminal may be in communication with elements of the transceiver 100 to facilitate a connection to the application 190, which may be an element of a computer or microprocessor separate from the transceiver 100. In addition to providing the functions described below, the application 190 may adjust the output voltages of the power supplies 180 in some embodiments. The application 190 may comprise circuitry, computer software and/or hardware, and/or some other type of control and/or data processing elements. The application 190 is not limited to any particular type of hardware or software. As such, terms such as "computer," "processor," "microprocessor," and the like may be, used interchangeably herein when discussing the application 190. The functions of these components will be described in greater detail below in the context of the operation of the transceiver 100 of FIG. 2.

The example of FIG. 2 includes a PLD 150 which may control operation of the transceiver 100. The PLD 150 may be a complex programmable logic device (CPLD), field-programmable gate array (FPGA), or other type of device. In some embodiments, other types of controllers may be used in place of or in addition to the PLD 150. The PLD 150 may be in communication with a MOSFET driver 170. A MOSFET driver 170 is shown in this embodiment because MOSFETs 111, 112, 113, 114, 115, and 116 are used in the H-bridge 110, but if other types of devices are used in the H-bridge, an appropriate driver 170 may be provided if a driver is useful for controlling the devices in the H-bridge. In embodiments where all are present, the PLD 150, MOSFET driver 170, and/or application 190 may be considered a control unit for controlling the transceiver 100. The driver 170 may be in communication with each of the MOSFETs 111, 112, 113, 114, 115, and 116 in the H-bridge 110 and may be able to drive each of the MOSFETs 111, 112, 113, 114, 115, and 116 selectively. The PLD 150 may be able to direct the driver 170 to drive none of the MOSFETs 111, 112, 113, 114, 115, and 116, all of the MOSFETs 111, 112, 113, 114, 115, and 116, or some subset of the MOSFETs 111, 112, 113, 114, 115, and 116. Depending on which MOSFETs 111, 112, 113, 114, 115, and 116 are driven, the H-bridge 110 may be capable of operating as either a transmitter or a receiver, and the H-bridge 110 may further be capable of operating in a variety of transmission and/or reception modes. The various modes may be selectable automatically and/or by a user. For example, a user may be able to select operational modes using the application 190.

Some or all of the circuit components of the transceiver 100 may be packaged together on a circuit board and/or in an enclosure. For example, elements such as the H-bridge 110, resistors 121-124, ADCs 131-133, OP-AMPs 141-145, PLD 150, MOSFET driver 170, and/or other components or any subset of the above may be disposed on one or more circuit boards such as motherboards or add-on boards. In some embodiments, these boards may be disposed in enclosures also containing voltage references 161-162, power supplies 180 and/or additional components or any subset of the above. Multiple transceivers 100 may be packaged together in some embodiments, and transceivers 100 may also be packaged with other devices in some embodiments.

A first transmitter mode for the transceiver 100 may function when MOSFETs Q1 111, Q2 112, Q5 115, and Q6 116 are selectively driven by the driver 170. Q3 113 and Q4 114 may not be driven and may therefore act as open switches within the circuit. The application 190 may direct the PLD 150 to operate the H-bridge 110 in the first mode in some embodiments. The power supply 180 may supply a signal to the H-bridge 110. The signal generated by the power supply 180 may be selected by the application 190 in some embodiments. The H-bridge 110 may take in the power supply 180 signal and output a signal for transmission to the track interface 20. A transceiver 100 operating in the first transmitter mode may be capable of transmitting coded AC, coded DC, and/or AF signals. The PLD 150 may cause the MOSFET driver 170 to drive the MOSFETs 111, 112, 115, and 116 so that they produce a desired signal of one of these types for transmission, as will be described in greater detail with respect to FIGS. 3A-3C below.

Because the transceiver 100 may be used in railroad operations, railroad safety standards may require sampling of the signal generated by the transceiver 100 at one or more points in the circuit. For example, a voltage across a node between Q2 112 and Q6 116 and a node between Q1 111 and Q5 115 may be conditioned by OP-AMP(D) 142. OP-AMP(D) 142 may output a voltage sample of the generated signal. Also, a current may be sensed with R4 124 and conditioned by OP-AMP(C) 141. OP-AMP(C) 141 may output a current sample of the generated signal. The voltage and current samples may be sampled by ADC(B) 131, which may perform an analog to digital conversion on the samples and output the result to the PLD 150. The PLD 150 may transmit the digital voltage and current data to the application 190 for analysis and/or reporting.

A transmit voltage across a node between Q2 112 and Q6 116 and a node between Q1 111 and Q5 115 may also be conditioned by OP-AMP(L) 144. OP-AMP(L) 144 may output a voltage sample of the generated signal. Also, a current may be sensed with R3 123 and conditioned by OP-AMP(M) 145. OP-AMP(M) 145 may output a current sample of the generated signal. The voltage and current samples may be sampled by ADC(K) 133, which may perform an analog to digital conversion on the samples. ADC(K) 133 may output the result directly to the application 190 for analysis and/or reporting. As seen in FIG. 2, the polarities of OP-AMP(D) 142 and OP-AMP(L) 144 may be reversed with respect to the inputs, and the polarities of OP-AMP(C) 141 and OP-AMP (M) 145 may also be reversed with respect to the inputs. This may result in opposite numerical voltage and current readings being supplied to the application 190 for the same signal. This may provide signal diversity, which may be useful for safe railroad equipment operation.

A second transmitter mode for the transceiver 100 may function when MOSFETs Q1 111, Q2 112, Q3 113, and Q4 114 are selectively driven by the driver 170. Q5 115 and Q6 116 may not be driven and may therefore act as open switches within the circuit. The application 190 may direct the PLD 150 to operate the H-bridge 110 in the second mode in some embodiments. The power supply 180 may supply a signal to the H-bridge 110. The signal generated by the power supply 180 may be selected by the application 190 in some embodiments. The H-bridge 110 may take in the power supply 180 signal and output a signal for transmission to the track interface 20. A transceiver 100 operating in the second transmitter mode may be capable of transmitting coded AC, coded DC, and/or AF signals. The PLD 150 may cause the MOSFET driver 170 to drive the MOSFETs 111, 112, 113, and 114 so that they produce a desired signal of one Of these types for transmission, as will be described in greater detail with respect to FIGS. 3A-3C below.

As in the first transmitter mode, operation in the second transmitter mode may involve sampling of the signal generated by the transceiver 100 at one or more points in the circuit, which may be done to comply with railroad safety regulations. For example, a voltage across a node between Q2 112 and Q4 114 and a node between Q1 111 and Q3 113 may be conditioned by OP-AMP(D) 142. OP-AMP(D) 142 may output a voltage sample of the generated signal. Also, a current may be sensed with R4 124 and conditioned by OP-AMP(C) 141. OP-AMP(C) 141 may output a current sample of the generated signal. The voltage and current samples may be sampled by ADC(B) 131, which may perform an analog to digital conversion on the samples and output the result to the PLD 150. The PLD 150 may transmit the digital voltage and current data to the application 190 for analysis and/or reporting.

A transmit voltage across a node between Q2 112 and Q4 114 and a node between Q1 111 and Q3 113 may also be conditioned by OP-AMP(L) 144. OP-AMP(L) 144 may output a voltage sample of the generated signal. Also, a current may be sensed with R3 123 and conditioned by OP-AMP(M) 145. OP-AMP(M) 145 may output a current sample of the generated signal. The voltage and current samples may be sampled by ADC(K) 133, which may perform an analog to digital conversion on the samples. ADC(K) 133 may output the result directly to the application 190 for analysis and/or reporting. As seen in FIG. 2, the polarities of OP-AMP(D) 142 and OP-AMP(L) 144 may be reversed with respect to the inputs, and the polarities of OP-AMP(C) 141 and OP-AMP (M) 145 may also be reversed with respect to the inputs. This may result in opposite numerical voltage and current readings being supplied to the application 190 for the same signal. This may provide signal diversity, which may be useful for safe railroad equipment operation.

In the second transmitter mode, an additional signal sample may be taken. R1 121 and R2 122 may sense a current which may be conditioned by OP-AMP(I) 143. The output of OP-AMP(I) 143 may be sampled by ADC(B) 131, which may perform an analog to digital conversion on the signal. ADC (B) 131 may output the result to the PLD 150, which may transmit the digital current data to the application 190 for analysis and/or reporting.

Figure 3A:
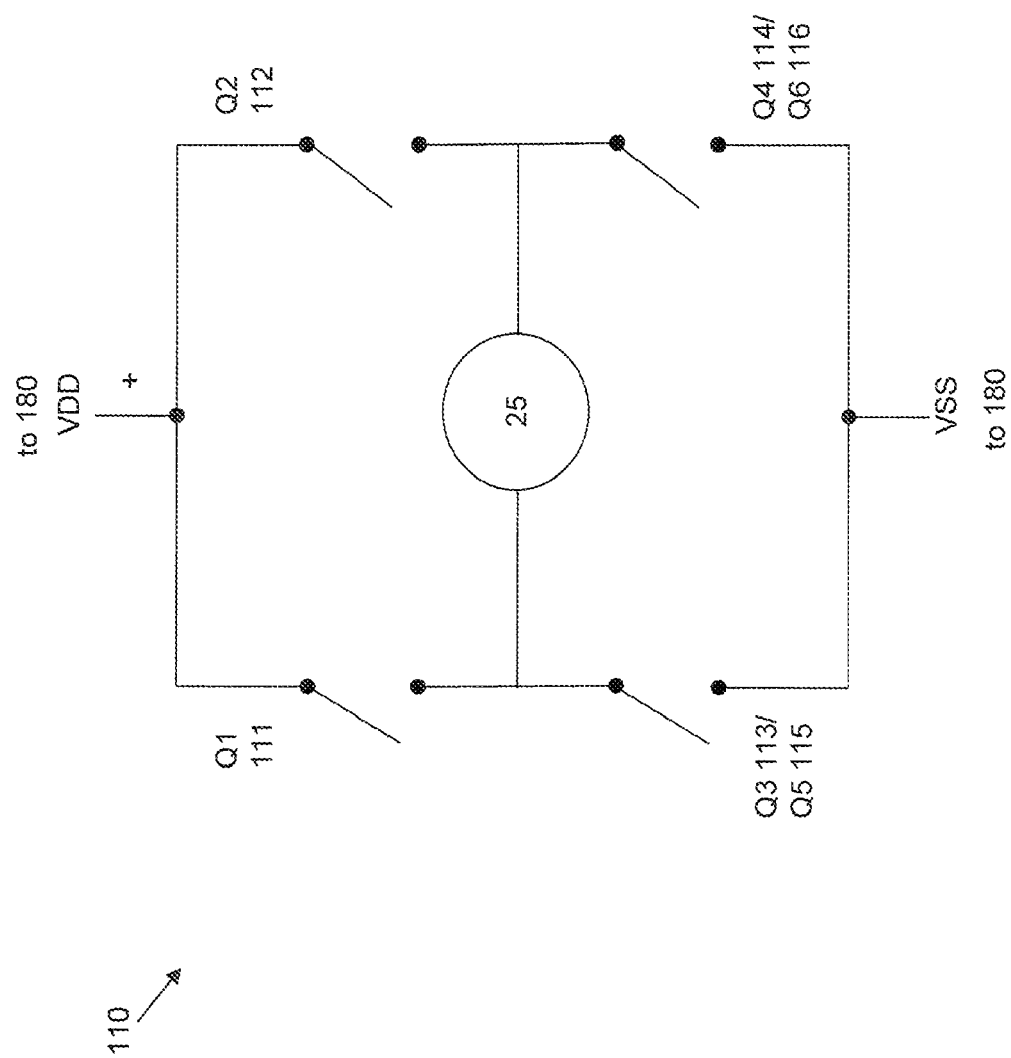
FIG. 3A depicts an H-bridge circuit according to an embodiment of the invention.
Figure 3B:
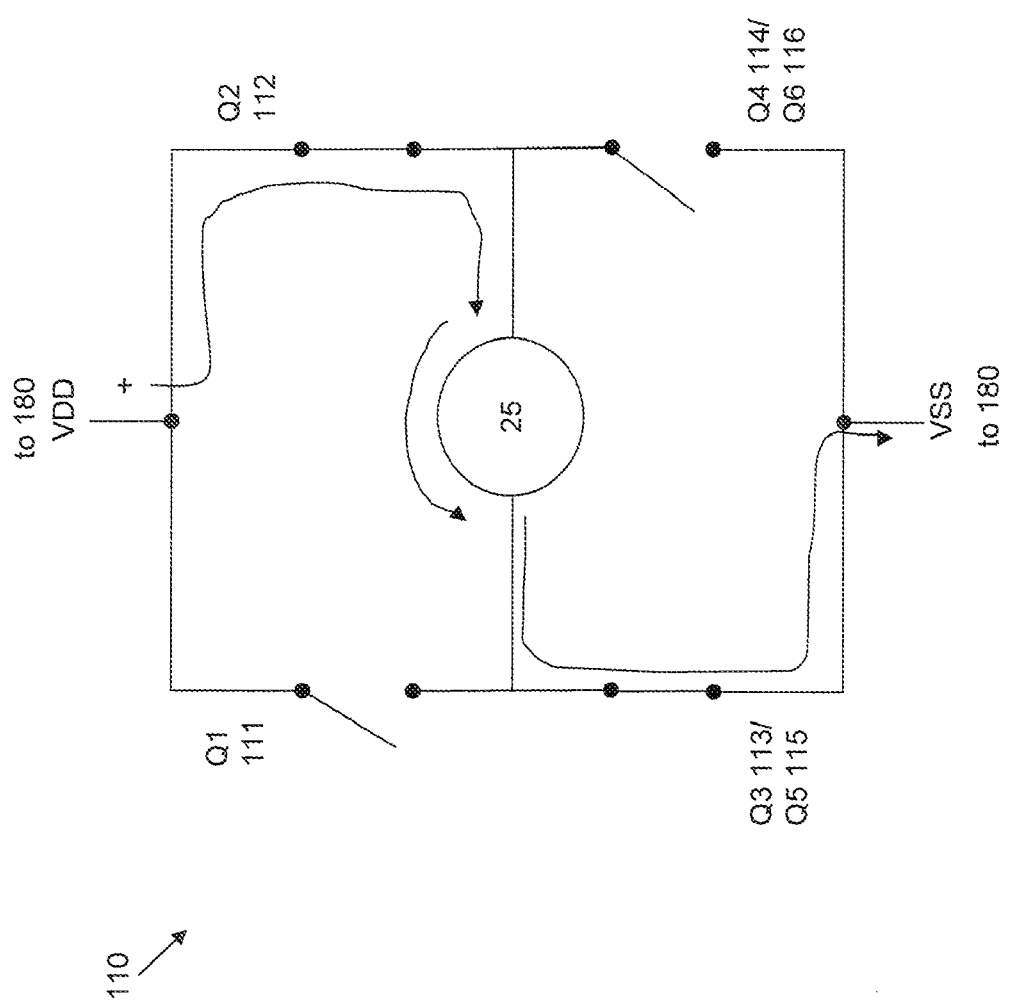
FIG. 3B depicts an H-bridge circuit according to an embodiment of the invention.
Figure 3C:
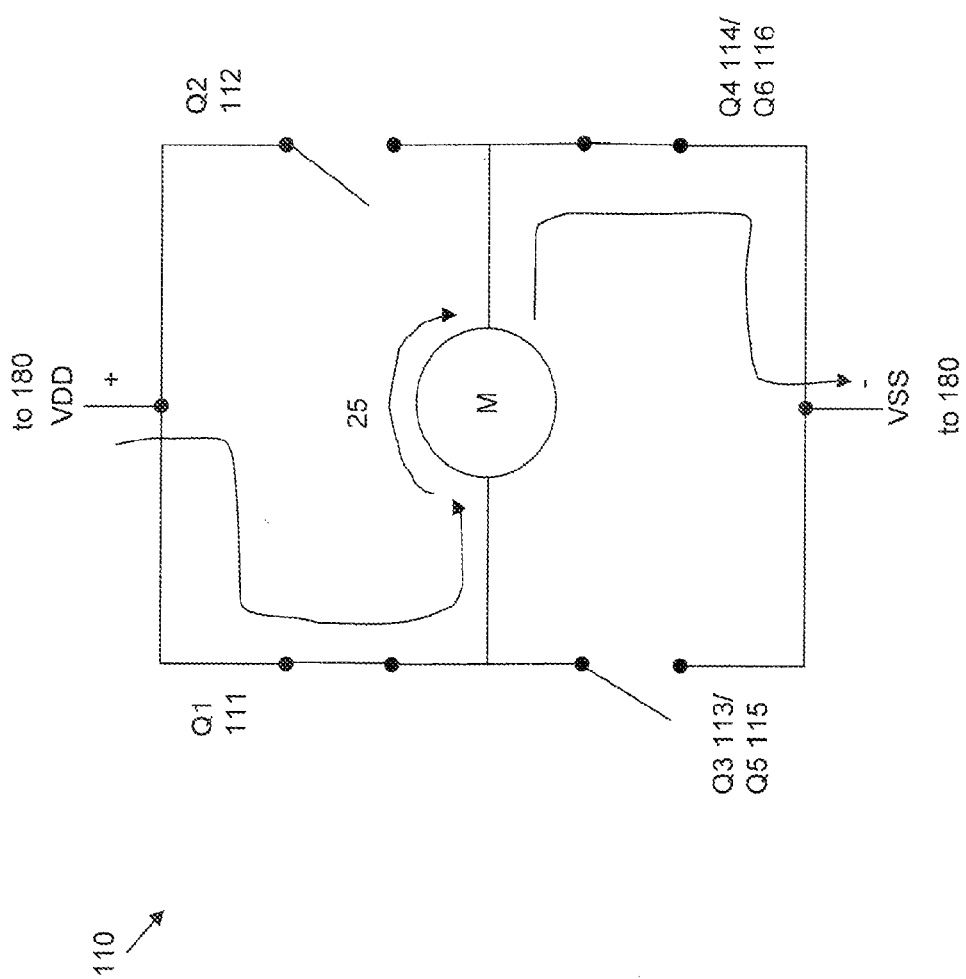
FIG. 3C depicts an H-bridge circuit according to an embodiment of the invention.

FIGS. 3A-3C depict an H-bridge circuit 110 according to an embodiment of the invention, providing examples of H-bridge signal generation operations. In FIGS. 3A-3C, an H-bridge circuit 110 according to FIG. 2 is shown. The H-bridge 110 may be operated in either the first or second transmit mode in this example. When the H-bridge 110 is operated in the first transmit mode, Q1 111, Q2 112, Q5 115, and Q6 116 may be active (i.e., transistors Q3 113 and Q4 114 may be switched off and not actively controlled in the first transmit mode). When the H-bridge 110 is operated in the second transmit mode, Q1 111, Q2 112, Q3 113, and Q4 114 may be active (i.e., transistors Q5 115 and Q6 116 may be switched off and not actively controlled in the first transmit mode). In either case, Q1 111 and Q2 112 may be connected to one terminal of the power supply 180 (for example a positive terminal), and either Q5 115 and Q6 116 or Q3 113 and Q4 114 may be connected to the other terminal of the power supply 180 (for example a negative terminal). As shown in FIG. 2, resistors 121 and 122 may be interposed between Q3 113 and Q4 114 and the power supply 180, but the basic operation described in FIGS. 3A-3C may be the same regardless of transmit mode.

In FIG. 3A, each of the four active transistors is switched off. In this state, no current may flow through the load 25.

In FIG. 3B, a current is applied to the load 25 in a first direction. In the first transmit mode, Q2 112 and Q5 115 may be directed to be closed by the MOSFET driver 170, and Q1 111 and Q6 116 may be directed to be open by the MOSFET driver 170. In the second transmit mode, Q2 112 and Q3 113 may be may be directed to be closed by the MOSFET driver 170, and Q1 111 and Q4 114 may be may be directed to be open by the MOSFET driver 170.

In FIG. 3C, a current is applied to the load 25 in a second direction opposite the first direction. In the first transmit mode, Q1 111 and Q6 116 may be directed to be closed by the MOSFET driver 170, and Q2 112 and Q5 115 may be directed to be open by the MOSFET driver 170. In the second transmit mode, Q1 111 and Q4 114 may be may be directed to be closed by the MOSFET driver 170, and Q2 112 and Q3 113 may be may be directed to be open by the MOSFET driver 170.

The MOSFET driver 170 may avoid directing all transistors to close at the same time to avoid shorting positive and negative terminals of the power supply 180 (for example shorting a power signal to ground) and/or damaging one or more of the transistors and/or the power supply 180.

The transmit modes may switch active MOSFETs such that desired track signals may be generated. For example, for coded AC and/or coded DC circuits, the MOSFETs may be switched to generate a rectangular pulse voltage signal at a very low frequency, resulting in a VLF coded track signal being transmitted across a load. For an AF track circuit, pulse-width modulation (PWM) may be used to generate an audio frequency track signal. The PWM technique may switch the H-bridge at a higher frequency than the frequency of the final track signal. During each PWM switching cycle, the H-bridge may be driven to turn on MOSFETs in either a first direction or a second direction following a turn off time. A proportional of turn on time to the period of a switching cycle may be the duty cycle.

Figure 4A:
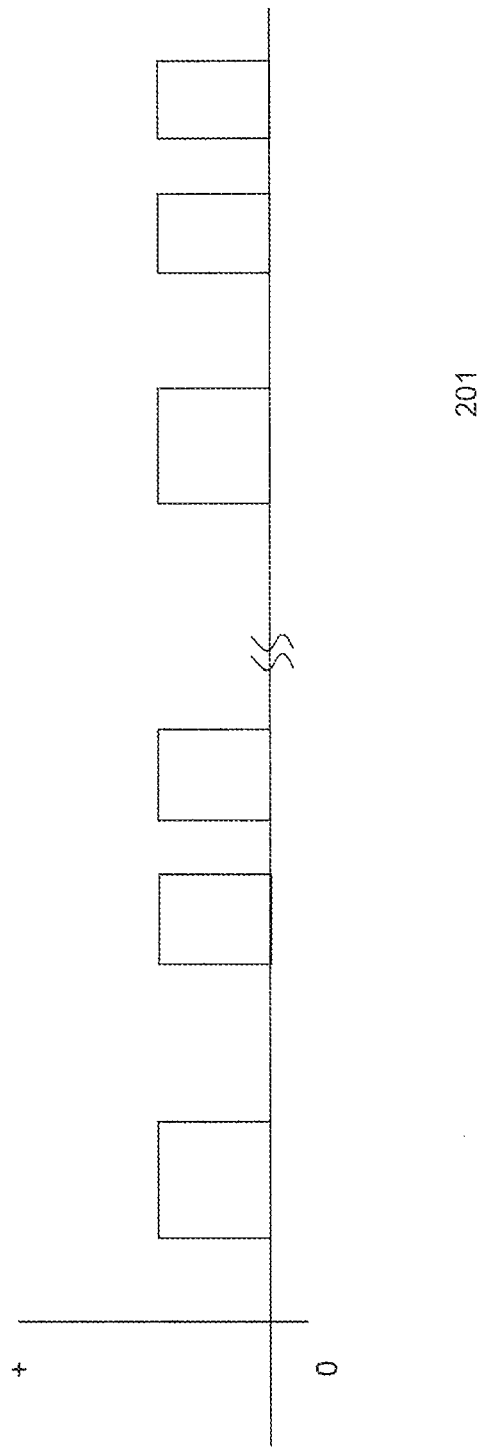
FIG. 4A depicts a signal output from an H-bridge circuit according to an embodiment of the invention.
Figure 4B:
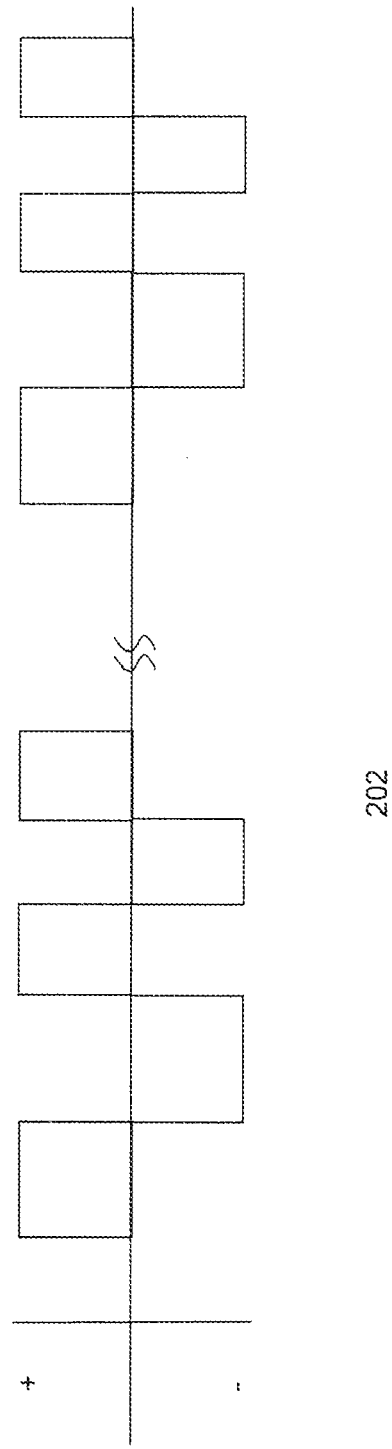
FIG. 4B depicts a signal output from an H-bridge circuit according to an embodiment of the invention.
Figure 4C:
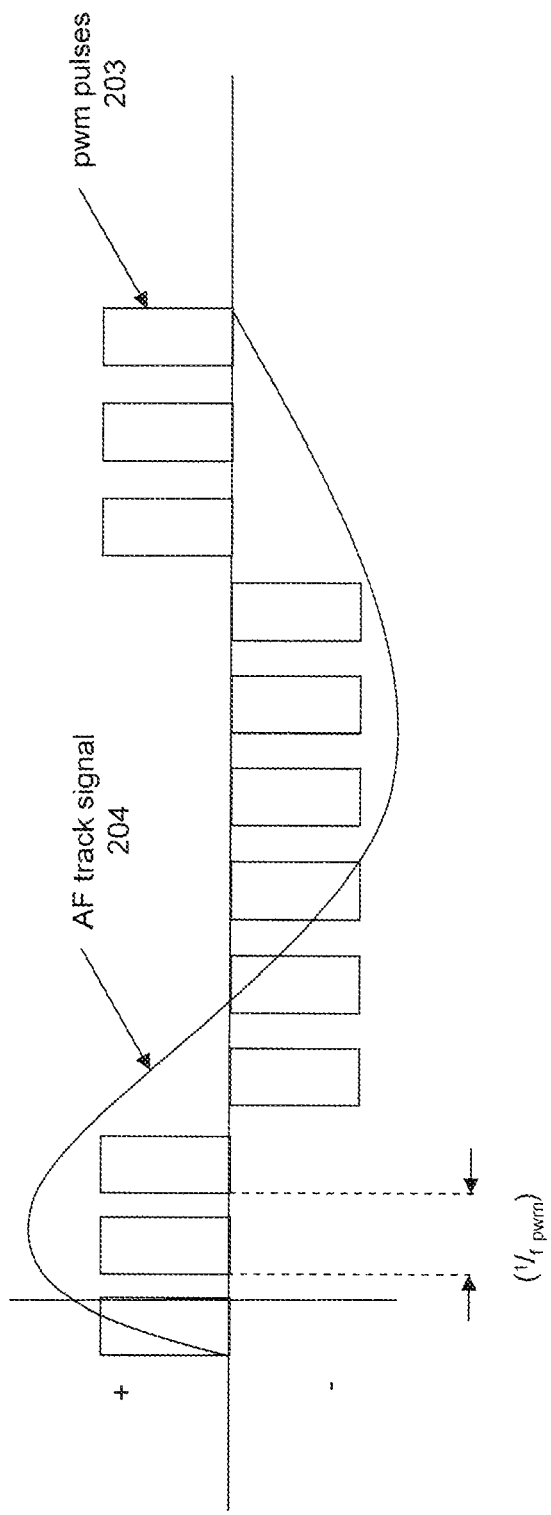
FIG. 4C depicts a signal output from an H-bridge circuit according to an embodiment of the invention.

FIGS. 4A-4C depict signal outputs 201-203 from an H-bridge circuit according to an embodiment of the invention. For a coded DC transmission example, a transceiver 100 operating in either the first or second transmit mode may maintain either the H-bridge 110 configuration of FIG. 3B or FIG. 3C during transmission to produce a unipolar DC signal or may pulse between the H-bridge 110 configurations of FIG. 3A and either FIG. 3B or FIG. 3C to produce a pulse output such as the example signal 201 shown in FIG. 4A. A duration and/or polarity of the pulse and/or the duration between two consecutive groups of pulses may be varied as shown in this example 201 or in some other pattern. The pattern may be defined, for example, by the application 190 and/or by user input to the application 190.

For a coded AC transmission example, a transceiver 100 operating in either the first or second transmit mode may cycle between the H-bridge 110 configurations of FIG. 3A, FIG. 3B, and FIG. 3C to produce a bipolar pulse output such as the example signal 202 shown in FIG. 4B. A duration and/or polarity of the pulse and/or the duration between two consecutive groups of pulses may be varied as shown in this example 202 or in some other pattern. The pattern may be defined, for example, by the application 190 and/or by user input to the application 190.

For an AF transmission example, a transceiver 100 operating in either the first or second transmit mode may cycle between the H-bridge 110 configurations of FIG. 3A, FIG. 3B, and FIG. 3C to produce a PWM output having a nominal center frequency such as the example signal 203 shown in FIG. 4C. For example, the nominal center frequency may be in the range of 20 Hz-20 KHz. The duty cycle of the square wave output 203 may be varied as shown in this example or in some other pattern. The signal may be frequency constant or frequency varied to have a higher or lower frequency than the nominal center frequency such that data is encoded in the signal through the frequency variation. The equivalent voltage applied to the load during a PWM cycle may be an average value of power supply voltage times duty cycle. By controlling the duty cycle, the H-bridge can generate varied wave forms such as sinusoidal AF signals like the example signal 204 of FIG. 4C or other wave forms. In any of the above cases, the PLD 150 and/or the application 190 may shape the transmitted signal by causing the MOSFET driver 170 to open and close the transistors such that a desired signal is transmitted.

The transceiver 100 may also be capable of operating in a current receiver mode. In this mode, MOSFETs Q3 113 and Q4 114 may be driven by the MOSFET driver 170 and Q1 111, Q2 112, Q5 115, and Q6 116 may be off. The application 190 may direct the PLD 150 to operate the H-bridge 110 in the current receiver mode in some embodiments. R1 121 and R2 122 may operate as current sensors detecting current flowing from the track interface 20 and may be viewed as part of a track load for a separate transmitter. A transceiver 100 operating in the current receiver mode may be capable of detecting coded AC and/or coded DC signals. The application 190 or some other control element may turn off the power supply 180 when the transceiver 100 is operating in the receiver mode.

Various signal measurement systems and methods may be available for a transceiver 100 operating in current receiver mode. R1 121 and R2 122 may form a current sensing resistor set when Q1 111, Q2 112, Q5 115, and Q6 116 are off, and the differential OP-AMP(I) 143 may sense the current strength through R1 121 and R2 122. A voltage output from OP-AMP (I) 143 may be proportional to the current flowing through R1 121 and R2 122. The output of the OP-AMP(I) 143 may be fed to ADC(B) 131, which may perform analog to digital conversion and provide the resulting digital output to the PLD(A) 150. The PLD(A) 150 may in turn provide the digital current data to the application 190.

Another signal measurement may be performed by using R3 123 as a current sensor. OP-AMP(M) 145 may sample and condition the current through R3 123 and may feed the result to ADC(K) 133. ADC(K) 133 may perform an analog to digital conversion on the current data and provide it to the application 190.

R4 124 may also be used as a current sensor. OP-AMP(C) 141 may sample and condition the current through R4 124 and may feed the result to ADC(B) 131. ADC(K) 131 may perform an analog to digital conversion on the current data and provide it to the PLD(A) 150. The PLD(A) 150 may in turn provide the digital current data to the application 190.

A current signal may also be measured by reading a voltage across a node between Q4 114 and R3 123 and a node between Q3 113 and R4 124. This voltage may be proportional to a total current flowing through R1 121, R2 122, Q3 113, and Q4 114. MOSFETs Q3 113 and Q4 114 may be operated in saturation mode. MOSFETs operating in saturation mode may have a resistance (Rds-on). When a total resistance value of R1 121 and R2 122 is sufficiently greater than a total Rds-on value of Q3 113 and Q4 114, the voltage may be measured as a current sensor. The application 190 may know the Rds-on value and compensate for it in its measurement. The voltage across these nodes may be conditioned by OP-AMP(D) 142, and the output may be sampled by ADC(B) 131. ADC(B) 131 may perform analog to digital conversion and provide the resulting digital output to the PLD(A) 150. The PLD(A) 150 may in turn provide the digital current data to the application 190. The voltage across the nodes may also be conditioned by OP-AMP(L) 144, and the output may be sampled by ADC(K) 133. ADC(K) 133 may perform an analog to digital conversion and provide the resulting signal to the application 190. As seen in FIG. 2, the polarities of OP-AMP(D) 142 and OP-AMP(L) 144 may be reversed with respect to the inputs and/or the gains of OP-AMP(D) 142 and OP-AMP(L) 144 may be set differently. This may result in opposite readings and/or differently gained readings being supplied to the application 190 for the same signal. This may provide signal diversity, which may be useful for safe railroad equipment operation.

The transceiver 100 may also be capable of operating in a voltage receiver mode. A transceiver 100 operating in the voltage receiver mode may be capable of detecting AF signals. In this mode, all MOSFETs Q1 111, Q2 112, Q3 113, Q4 114, Q5 115 and Q6 116 may be driven by the MOSFET driver 170 to be off. A voltage signal may be measured by reading a voltage across a node between Q4 114 and R3 123 and a node between Q3 113 and R4 124. The voltage across these nodes may be conditioned by OP-AMP(D) 142, and the output may be sampled by ADC(B) 131. ADC(B) 131 may perform analog to digital conversion and may provide the resulting digital output to the PLD(A) 150. The PLD(A) 150 may in turn provide the digital current data to the application 190. The voltage across the nodes may also be conditioned by OP-AMP(L) 144, and the output may be sampled by ADC(K) 133. ADC(K) 133 may perform an analog to digital conversion and provide the resulting signal to the application 190. As seen in FIG. 2, the polarities of OP-AMP(D) 142 and OP-AMP(L) 144 may be reversed with respect to the inputs and/or the gains of OP-AMP(D) 142 and OP-AMP(L) 144 may be set differently. This may result in opposite readings and/or differently gained reading being supplied to the application 190 for the same signal. This may provide signal diversity, which may be useful for safe railroad equipment operation.

Additional safety features may be present in embodiments of the transceiver 100. For example, an output of the isolated power supply 180 may be sampled by a power supply ADC (H) 132. ADC(H) 132 may perform an analog to digital conversion on this sample and supply the result to the PLD(A) 150, which may in turn supply the converted signal to the application 190. The application 190 may use this data to monitor the isolated power supply's 180 performance and/or to regulate the signal generated by the isolated power supply 180. ADC(B) 131 may use a voltage reference (G) 161 to perform its analog to digital processing, and ADC(K) 133 may use a voltage reference (J) 162 to perform its analog to digital processing. The voltage reference (G) 161 may be sampled by ADC(H) 132, which may perform an analog to digital conversion on this sample and supply the result to the PLD(A) 150. PLD(A) 150 may supply the converted signal to the application 190. The application 190 may use this data to ensure that the ADC(B) 131 has a suitable reference voltage for analog to digital conversion. Similarly, the voltage reference (J) 162 may be sampled by ADC(B) 131, which may perform an analog to digital conversion on this sample and supply the result to the PLD(A) 150. PLD(A) 150 may supply the converted signal to the application 190. The application 190 may use this data to ensure that the ADC(K) 133 has a suitable reference voltage for analog to digital conversion.

In some embodiments, the transceiver 100 may be capable of functioning as both a transmitter and receiver for a track circuit by switching modes. For example, two or more transceivers 100 may be placed in communication with a track 10 through track interfaces 20. In some embodiments, the two or more transceivers 100 may be located in substantially the same place, and each transceiver's 100 corresponding track interface 20 may connect to the track 10 in substantially the same place. In some embodiments, the two or more transceivers 100 and track interfaces 20 may be spaced apart from one another. The first transceiver 100 may be placed in a transmitter mode and the second transceiver 100 may be placed in a receiver mode. The first transceiver 100 may transmit a signal through the track 10, and the signal may be received by the second transceiver 100. The first transceiver 100 may be switched to a receiver mode, and the second transceiver 100 may be switched to a transmitter mode, and the process described above may be reversed. In some embodiments, a transceiver 100 in a transmitter mode may transmit a code signal to a nearby transceiver 100 which may inform the nearby transceiver 100 that the transceiver 100 is in a transmitter mode, so that the nearby transceiver 100 can be placed in or remain in a receiver mode. This code signal may be sent through some communication network other than the track 10, such as a wired or wireless network for example. In some embodiments, the two transceivers 100 may be located in the same enclosure and/or on the same circuit board, and may be able to communicate their operating modes to one another directly and/or through control components such as the application 190. In some embodiments, enclosures having two transceivers 100 may be located at several points along a track 10. At each point, one transceiver 100 may operate as a transmitter and the other transceiver 100 may operate as a receiver. The receiving transceiver 100 at a point may receive a signal and communicate the signal to the transmitting transceiver 100. The transmitting transceiver 100 may transmit the received signal so a next pair of transceivers 100 can repeat the process. This may increase the range of a signal transmitted through a track 10.

In the six transistor embodiment described above, the transceiver 100 may be used in either AC overlay or constant warning time track circuits 10. The presence of four transistors that can be selectively activated or deactivated to form the lower legs of an H bridge circuit may allow the six transistor transceiver 100 to be used in either of these types of track circuit. Alternative embodiments may utilize four transistor H-bridges which may omit either Q3 113 and Q4 114 or Q5 115 and Q6 116. Such a four-transistor H-bridge may be used in either an AC overlay or a constant warning time track circuit 10, depending on which pair of transistors is omitted.

A four transistor embodiment may be less flexible than the six transistor embodiment described above in that it may be useful for only one type of track circuit, but it may still be more flexible than other circuits (for example a basic prior art H-bridge) in that it can be used as both a transmitter and a receiver by controlling the transistors as described above.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, those of ordinary skill in the relevant art will appreciate that many circuit configurations aside from those shown can provide a configurable transceiver, and the claims are not intended to be limited only to the specific circuits illustrated above. Many components, such as ADCs and OP-AMPS used for signal sampling may be provided for redundancy and safety, and those of ordinary skill will appreciate that in embodiments wherein redundancy is not required, many of these elements may be omitted or repurposed. Thus, the present embodiments should not be limited by any of the above-described embodiments In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

What is claimed is:

1. A transceiver comprising:
    an H-bridge circuit comprising at least four switches;
    a control unit in communication with the H-bridge circuit, the control unit being constructed and arranged to selectively drive the at least four switches to selectively cause the H-bridge circuit to function as a transmitter in a transmit mode or a receiver in a receive mode, wherein a combination of the switches selectively driven in the receive mode is different from a combination of the switches selectively driven in the transmit mode;
    a power supply terminal in communication with the H-bridge circuit, the power supply terminal being constructed and arranged to connect to a power supply; and
    a pair of track interface terminals in communication with the H-bridge circuit, the track interface terminals constructed and arranged to connect to a track interface cable so that the H-bridge circuit is capable of transmitting signals to and/or receiving signals from the track interface cable.

2. The transceiver of claim 1, further comprising a power supply constructed and arranged to supply a signal to the power supply terminal.

3. The transceiver of claim 2, wherein the control unit is in communication with the power supply and is constructed and arranged to regulate a signal generated by the power supply.

4. The transceiver of claim 1, further comprising a pair of track interface cables connected to the track interface and constructed and arranged to be coupled to a railroad track so that the H-bridge circuit is capable of transmitting and/or receiving signals through the railroad track.

5. The transceiver of claim 1, wherein the control unit comprises a processor, a programmable logic device, and/or a transistor driver.

6. The transceiver of claim 1, wherein the at least four switches are transistors.

7. The transceiver of claim 1, wherein the at least four switches are MOSFETs.

8. The transceiver of claim 1, further comprising a current sensing device in communication with the H-bridge circuit and the control unit, the current sensing device being constructed and arranged to sample a current in the H-bridge circuit and transmit current data to the control unit.

9. The transceiver of claim 8, wherein the current sensing device comprises an OP-AMP constructed and arranged to sample a current through a resistor in the H-bridge circuit.

10. The transceiver of claim 9, wherein the current sensing device further comprises an analog to digital converter constructed and arranged to convert an output of the OP-AMP to obtain current data.

11. The transceiver of claim 8, wherein the current sensing device comprises:
    an OP-AMP constructed and arranged to sample a voltage across two nodes in the H-bridge circuit.

12. The transceiver of claim 11, wherein the two nodes are arranged such that the sampled voltage is proportional to the current in the H-bridge circuit.

13. The transceiver of claim 11, wherein the two nodes are arranged such that the sampled voltage is a voltage across the pair of track interface terminals.

14. The transceiver of claim 9, wherein the current sensing device further comprises an analog to digital converter constructed and arranged to convert an output of the OP-AMP to obtain current data.

15. The transceiver of claim 8, wherein:
    the current sensing device further comprises a voltage reference in communication with the control unit; and
    the control unit is constructed and arranged to monitor an output of the voltage reference.

16. The transceiver of claim 1, wherein
    the at least four switches comprise at least six switches; and
    the control unit is further constructed and arranged to selectively drive the at least six switches to selectively cause the H-bridge circuit to function in the transmit mode or the receive mode.

17. The transceiver of claim 16, wherein:
    the transmitter mode is one of a plurality of selectable transmit modes; and
    the control unit is further constructed and arranged to select the transmit mode from among the plurality of selectable transmit modes.

18. The transceiver of claim 16, wherein:
    the at least six switches are transistors;
    each of the at least six transistors comprises a source and a drain;
    the sources of two of the at least six transistors are in communication with a first connector of the power supply interface, the first connector being constructed and arranged to connect to a first lead of a power supply;
    the drains of the two of the at least six transistors are in communication with the sources of the other four of the at least six transistors; and
    the drains of the other four of the at least six transistors are in communication with a second connector of the power supply interface, the second connector being constructed and arranged to connect to a second lead of a power supply, wherein each of the drains of two of the other four of the at least six transistors are in communication with the second connector of the power supply interface through a resistor.

19. The transceiver of claim 18, wherein the control unit is constructed and arranged to:
   drive one of the two transistors during the transmit mode;
   drive one of one pair of the other four of the at least six transistors during the transmit mode; and
   not drive the remaining four of the at least six transistors during the transmit mode.

20. The transceiver of claim 19, wherein the control unit is further constructed and arranged to:
   alternate which one of the two of the at least six transistors is being driven; and
   alternate which one of the one pair of the other four of the at least six transistors is being driven.

21. The transceiver of claim 18, wherein the control unit is constructed and arranged to:
   drive two of the at least four of the at least six transistors during the receive mode; and
   not drive the remaining four of the at least six transistors during the receive mode.

22. The transceiver of claim 18, wherein the control unit is constructed and arranged to drive none of the at least six transistors during the receive mode.

23. A multi-mode transceiver comprising a plurality of the transceivers of claim 1.

24. The multi-mode transceiver of claim 23, wherein the multi-mode transceiver is constructed and arranged to communicate with at least one other multi-mode transceiver via a network.

25. A method of operating a track circuit transceiver comprising:
   selecting an operational mode from a plurality of available operational modes, the plurality of operational modes comprising a receive mode and a transmit mode; and
   selectively driving switches within an H-bridge circuit comprising at least four switches to cause the H-bridge circuit to function as a transmitter when the transmit mode is selected as the operational mode or a receiver when the receive mode is selected as the operational mode;
   wherein the H-bridge circuit is connected to a track interface cable, and wherein a combination of the switches selectively driven in the receive mode is different from a combination of the switches selectively driven in the transmit mode.

26. The method of claim 25, further comprising supplying a signal to the H-bridge circuit when the transmit mode is selected as the operational mode.

27. The method of claim 26, further comprising regulating the signal supplied to the H-bridge circuit.

28. The method of claim 25, wherein the at least four switches are transistors.

29. The method of claim 25, wherein the at least four switches are MOSFETs.

30. The method of claim 25, further comprising sampling a current in the H-bridge circuit.

31. The method of claim 30, wherein sampling the current comprises sampling a current through a resistor using an OP-AMP.

32. The method of claim 31, further comprising converting an analog output of the OP-AMP to a digital signal.

33. The method of claim 30, wherein sampling the current comprises sampling a voltage across two nodes of the H-bridge circuit using an OP-AMP.

34. The method of claim 33, wherein the two nodes are arranged such that the voltage is proportional to the current in the H-bridge circuit.

35. The method of claim 33, wherein the two nodes are arranged such that the sampled voltage is a voltage across a pair of track interface terminals in communication with the H-bridge circuit.

36. The method of claim 33, further comprising converting an analog output of the OP-AMP to a digital signal.

37. The method of claim 30, further comprising monitoring an output of a voltage reference constructed and arranged to provide a reference to an analog to digital converter constructed and arranged to convert a sampled current.

38. The method of claim 25, further comprising transmitting a signal to a railroad track using the H-bridge circuit.

39. The method of claim 25, further comprising receiving a signal from a railroad track using the H-bridge circuit.

40. The method of claim 25, wherein:
   the at least four switches comprise at least six switches;
   the method further comprises selectively driving the at least six switches to selectively cause the H-bridge circuit to function as a transmitter when the transmit mode is selected as the operational mode or a receiver when the receive mode is selected as the operational mode.

41. The method of claim 40, wherein the transmit mode is one of a plurality of selectable transmit modes.

42. The method of claim 41, wherein:
   the at least six switches are transistors;
   each of the at least six transistors comprises a source and a drain;
   the sources of two of the at least six transistors are in communication with a first connector of the power supply interface, the first connector being constructed and arranged to connect to a first lead of a power supply;
   the drains of the two of the at least six transistors are in communication with the sources of the other our of the at least six transistors; and
   the drains of the other four of the at least six transistors are in communication with a second connector of the power supply interface, the second connector being constructed and arranged to connect to a second lead of a power supply, wherein each of the drains of two of the other four of the at least six transistors are in communication with the second connector of the power supply interface through a resistor.

43. The method of claim 42, wherein selectively driving the transistors comprises:
   driving one of the two transistors during the transmit mode;
   driving one of one pair of the other four of the at least six transistors during the transmit mode; and
   not driving the remaining four of the at least six transistors during the transmit mode.

44. The method of claim 43, wherein selectively driving the transistors further comprises:
   alternating which one of the two of the at least six transistors is being driven; and
   alternating which one of the one pair of the other four of the at least six transistors is being driven.

45. The method of claim 42, wherein selectively driving the transistors comprises:
   driving two of the at least four of the at least six transistors during the receive mode; and
   not driving the remaining four of the at least six transistors during the receive mode.

46. The method of claim 42, wherein selectively driving the transistors comprises driving none of the at least six transistors during the receive mode.

47. The method of claim 25, further comprising transmitting and/or receiving a code signal via a network, the code signal indicating an operating mode of a transceiver.

\* \* \* \* \*